United States Patent [19]
Babson

[11] 3,880,714
[45] Apr. 29, 1975

[54] DIAGNOSTIC REAGENT
[75] Inventor: Arthur L. Babson, Chester, N.J.
[73] Assignee: Warner-Lambert Company, Morris Plaines, N.J.
[22] Filed: July 18, 1973
[21] Appl. No.: 380,307

[52] U.S. Cl. ............................. 195/99; 195/103.5 R
[51] Int. Cl. ........................................... G01n 33/00
[58] Field of Search ..................... 195/103.5 R, 99

[56] References Cited
UNITED STATES PATENTS
3,179,567   4/1965   Owren .......................... 195/103.5 R Primary Examiner—Alvin E. Tanenholtz
Attorney, Agent, or Firm—Albert H. Graddis; Frank S. Chow; George M. Yahwak

[57] ABSTRACT

This invention relates to an improved diagnostic reagent which is of particular application in routine pre-operative procedures for use in determining whether deficiencies in blood coagulation factors exist. The diagnostic reagent comprises a blood platelet substitute containing as an activator certain finely divided nonagglomerating fumed silica particles. The silica particles which are especially useful and effective are those which have the particular properties described.

5 Claims, No Drawings

DIAGNOSTIC REAGENT

In preparing patients for any major surgery, it is essential that routine laboratory procedures be undertaken to detect potential bleeding problems before they arise. Patients undergoing anti-coagulation therapy with heparin or other drugs also require continual screening throughout the therapy to ensure their safety. Since deficiencies in blood coagulation factors can exist at various stages in the blood coagulation mechanism, specific test procedures have been developed to enable a determination to be made of the stage or stages where the deficiency may lie.

The blood coagulation mechanism is a complex series of interrelated protein reactions which may be thought of as occuring in a "cascade effect". The first stages of the cascade are concerned with the formation of the visible blood clot, that is, whole blood trapped in a mesh of fibrin strands, and the final stage is lysis of the clot.

It is believed that the first stages of the coagulation process exists as "intrinsic" and "extrinsic" systems which share the final phase of the clotting process (the conversion of prothrombin to thrombin), but which differ in their individual pathways. The intrinsic system's pathway utilizes constituents which are present in the circulatory system (that is in the blood plasma) while the extrinsic system's pathway utilizes constituents released from damaged tissues.

In the intrinsic mechanism, the first phase is the activation of the Hageman factor (factor XII) which results from contact with foreign surfaces, vascular collagen skin and, in pathologic states, crystals of homocysteine and of sodium acid urate. The activated Hageman factor's major function is the activation of the plasma thromboplastin antecedent (PTA, factor XI) which, in turn, activates plasma thromboplastin component (PTC, factor IX). This, in turn, activates antihemophilic globulin (AHG, factor VIII). The combination of activated AHG and of platelet factor 3 forms an agent which activates the Stuart-Prower factor (SPF, factor X). The activated Stuart-Prower factor in the presence of the labile factor (factor V) form a complex which catalyzes the conversion of prothrombin (factor II) to thrombin in the presence of ionic calcium.

The extrinsic mechanism on the other hand is based on the direct release of thromboplastin from damaged tissues. In the presence of ionic calcium, thromboplastin reacts with the stable factor (SF, factor VII) to form a thromboplastin-stable factor complex which, in turn, activates the Stuart-Prower factor. The activated Stuart factor then converts prothrombin to thrombin.

Once thrombin is formed in either pathway, fibrin is formed from the substrate fibrinogen.

As brought out in U.S. Pat. No. 3,395,210, if there are any deficiencies in the various factors making up the blood coagulation mechanism these deficiencies are manifested in an abnormal blood clotting picture. This may be a failure to clot, excessively prolonged clotting time or poor clot retraction, among others.

It has been generally recognized that the partial thromboplastin time test (PTT) described by Langdell et al., J. Lab. & Clin. Med. 41: 637, 1953 is a test procedure moderately sensitive to deficiencies in all factors of the coagulation mechanism except factor VII, (which has no effect on the test) and platelet factor, (which is supplied by the test system).

Thus, a blood plasma to be tested is mixed with a reagent containing a component, which in the presence of optimum calcium ion concentration, acts to assure optimum platelet factor activity and the clotting time is noted. The range for a normal plasma is 40 to 100 seconds. An extended time of 120 seconds or longer would indicate a deficiency in one of the coagulation factors and further specific tests would be indicated.

The platelet factor substitute needed in the test system is generally obtained as described in U.S. Pat. No. 3,395,210, from warm-blooded animal brain tissue and is commercially available in lyophilized form containing rabbit brain cephalin.

It has also been observed that the clotting time noted where normal plasma is involved may vary considerably and studies directed toward determining the reasons for such variations have indicated that the presence of a suitable Hageman factor activator will ensure more uniform clotting times (the Activated Partial Thromboplastin Time Test). Examples of suitable activators which have been used, as described in U.S. Pat. No. 3,395,210, are finely-divided diatomaceous earth, bentonite, kaolin, sand and powdered glass in particle sizes of 2 to 20 microns.

The activated partial thromboplastin time assay has been further studied by Lenahan et al., Clinical Chemistry, Vol. 12, No. 5 (1966), in order to achieve a reliable and reproducible system for carrying out these assays. Among the criteria which an activator for use in such a system should meet, they mention a lack of enzyme inhibition, no alteration of the reaction mixture's pH, uniform particle size, the ability to resuspend readily, and the quality of allowing the end-point (indicative of fibrin formation) of the assay to be observed clearly and not be obscured. Among the activators tested was the fumed silica identified as Cab-O-Sil M-5, having a particle size of 12 millimicrons and a surface area of $200 \pm 25$ square meters per gram. However, the use of this material as the activator was not satisfactory because the determination of the end-point was obscured. The preferred activator disclosed in U.S. Pat. No. 3,395,210 is "Celite 505" which is diatomaceous earth, essentially a porous silica, with a particle size in the range of 2 to 20 microns. This material is preferred because it is inert, uniform in size, resuspends readily, and is essentially neutral in reaction.

In performing the APTT test, a 5 minute preincubation of plasma with APTT reagent is required to completely activate factor XII and the factor XI prior to initiation of the APTT test with $CaCl_2$. After this preactivation period, the plasma-reagent mixture is combined with one-half its volume of a 25 mM aqueous solution of calcium chloride. During the usual 5 minute preactivation period, however, the conventional activator (Celite 505) tends to settle out of suspension because of its weight and size and must be frequently resuspended. Not only is this resuspension step cumbersome with manual testing procedures, but with automated instrumentation for determining blood coagulation end-points it is quite impractical.

Accordingly, a primary object of this invention is to provide a stable platelet factor reagent system containing an activator which will satisfactorily activate factor XII yet which when used in automated coagulation assays does not require resuspension during the assay. Other objects of this invention will become more apparent from the following detailed description.

The platelet factor reagent system of this invention comprises a lyophilized composition which contains as the active ingredients a platelet factor reagent in combination with a factor XII activator.

The platelet factor reagent system may be obtained, for example, by extracting warm blooded mammalian brain tissue following the protocol of Bell and Alton (Nature 174:880–1 (1954)). To the brain extract obtained is added the factor XII activator in particulate form suspended in a buffer system having a pH of about 7.35, and the resulting mixture is then lyophilized.

A suitable activator having the required characteristics of this invention is a non porous fumed silica having a particle size of about 20 to 60 millimicrons, a surface area of 50 square meters per gram, and marketed commercially by Degussa, Inc., as Aerosil OX-50.

For optimum results, 0.05 to 1.0 per cent by weight of activator is mixed with each 100 ml of the mammalian brain extract, with 0.1 to 0.5 per cent by weight being the preferred addition. Further, to provide a uniform suspension when the lyophilized material is reconstituted in an aqueous solvent, the addition of about 0.5 to 3 per cent by weight of a suspending agent to the mixture undergoing lyophilization is advantageous. Suspending agents such as calcium-free acacia, tragacanth, guar gum, dextran, sucrose and the like have been found to have utility.

Colloidal silica particles, available commercially as Cab-O-Sil and Aerosil, contain silanol groups on their surfaces. These SiOH groups have a strong tendency to interact with each other through hydrogen bonding to form particle aggregates which settle out of the aqueous suspension. The number of silanol groups appears to be constant in all colloidal silica particles at about 3 groups per 100 square angstroms of particle surface area. Precipitated silicas, on the other hand, have even a higher density; about 6 silanol groups per 100 square angstroms of particle surface area.

The density of the silanol group is reduced, however, through condensation when Aerosil is reacted with organo-silicon haloids or alcohols or heated. The condensation of the silano groups begins at approximately 100°C and up to approximately 200°C it is completely reversible. If Aerosil is heated to 1100°C for two hours, silano groups can no longer be detected by chemical methods. On the inside of the silica particle, however, isolated silanol groups do remain because they are unable to condensate. Although silicas are generally hydrophilic, the calcined silicas, treated to remove silanol groups, become hydrophobic. Aerosil OX-50 is such a treated Aerosil whose silanol group density is less than about 3 groups per 100 square Angstroms of particle surface area.

Accordingly, when suspensions of Cab-O-Sil M5 and Aerosil OX-50 are prepared in water at concentrations of 1 and 0.1 per cent and allowed to stand overnight, much of the Cab-O-Sil, while very little of the Aerosil, settles out. While it would appear that Cab-O-Sil, having the smaller particle size, would remain in suspension longer, because of the large surface area and therefore significantly great number of silanol groups, individual particles agglomerate to form larger particles which because of their weight and size settle out of suspension faster than the Aerosil OX-50 particles; the Aerosil OX-50 particles remaining relatively discrete.

Maximum "activation" of the Hageman factor is not necessarily desirable in an APTT reagent. Maximum differentiation between the normal and abnormal complement of coagulation factors is the important criterion, and monitoring heparin therapy is one of the most important uses of the APTT.

The sensitivity of the APTT test to heparin was tested at various OX-50 concentrations to determine the optimum concentration of OX-50 for clinically monitoring heparin therapy.

EXAMPLE 1

A lyophilized platelet factor reagent was prepared by extracting 5 g. of Pel-Freez acetone powdered rabbit brain for 10 minutes with 250 ml of chloroform. The material was filtered and evaporated to dryness overnight at room temperature. The remaining residue was then dissolved in 250 ml of deionized water. To 30 ml of this brain extract was added 40 ml of 1M HEPES buffer at pH 7.35 (prepared by dissolving 238.3 g of N-2-Hydroxyethylpiperazine-N-2-ethane sulfonic acid in 400 ml of water, adjusting the pH to 7.50 with 1N NaOH and adjusting the volume to 1000 ml; upon dilution from 1M to 0.05M, this solution yields a pH 7.35 buffer) and 330 ml of a 1% aqueous solution of calcium-free acacia. 2 ml aliquots were dispensed into vials and lyophilized. These vials were reconstituted with 4 ml of OX-50 suspensions in all subsequent APTT assays.

The lyophilized platelet factor prepared above was reconstituted in an aqueous solution comprising 3 per cent sucrose and either 0.15 or 0.4 per cent of OX-50. Lyophilized normal plasma was reconstituted with heparin solutions or deionized water, in an amount to give a concentration of 0.0, 0.1, and 0.2 units of heparin per ml of plasma. The APTT test, as described in U.S. Pat. No. 3,395,210 was then performed and the following results obtained:

APTT TIME
(In Seconds)

| Units of Heparin/ml of Plasma | OX-50 concentration | |
|---|---|---|
| | 0.15 | 0.4 |
| 0 | 31.1 | 34.8 |
| .1 | 32.9 | 38.4 |
| .2 | 39.5 | 52.6 |

As the above results show, the 0.4 per cent of OX-50 is more sensitive (giving a wider spread of time needed for fibrin formation) than is the 0.15 per cent OX-50 suspension.

As presurgical screening of patients suspected of having coagulation factor deficient sera is one of the most important clinical uses of the APTT, the 0.4 per cent concentration of OX-50 was further studied in normal plasma and plasmas deficient in various coagulation factors to determine the normal and abnormal differentiation between these groups. The protocol used is that as described in U.S. Pat. No. 3,395,210.

The activated partial thromboplastin time for normal plasma was determined to be 34.1 seconds in this study.

The APTT test was repeated in triplicate employing human plasmas, each of which is known to be deficient in a single coagulation factor, and the following elapsed times in seconds for the fibrin strand formation was obtained:

| Sample | APTT (averages) |
| --- | --- |
| factor V deficient | 56.1 |
|  | 56.2 |
|  | 57.6 (56.6) |
| factor VIII deficient | 79.9 |
|  | 77.6 |
|  | 74.9 (77.5) |
| factor IX deficient | 102.5 |
|  | 99.9 |
|  | 99.9 (100.8) |
| factor X deficient | 75.1 |
|  | 73.8 |
|  | 75.2 (74.7) |
| factor XI deficient | 69.8 |
|  | 70.2 |
|  | 69.5 (69.8) |
| factor XII deficient | 69.6 |
|  | 70.0 |
|  | 72.7 (70.8) |

The above results clearly indicate the reproducibility, accuracy, and differentiation between normal and abnormal coagulation factors, when using the improved Hageman Factor activator of this invention in the Activated Partial Thromboplastin Time test.

I claim:

1. A lyophilized composition of matter suitable for reconstitution by addition of water comprising a blood platelet substitute comprising cephalin having platelet factor-like activity in combination with about 0.05 to about 1.0 per cent by weight of a non-porous fumed particulate silica having a particle size of about 20 to about 60 millimicrons and a surface area of about 50 square meters per gram.

2. The composition of claim 1 wherein the silica particles have less than approximately about 3 silano groups per 100 square angstroms of surface area.

3. The composition of claim 2 further comprising a suspending agent selected from the group consisting of calcium-free acacia, tragacanth, guar gum, dextran, and sucrose.

4. The composition of claim 2 wherein the particulate fumed silica is present in 0.1 to 0.5 per cent by weight.

5. A lyophilized composition of matter suitable for reconstitution by addition of water comprising blood platelet substitute selected from the group consisting of human and rabbit brain chloroform extracts in combination with finely-divided discrete inert particles and a suspending agent, said composition being buffered to a pH of about 7.5, the improvements of which comprise:

A. the finely-divided discrete inert particles being a nonporous fumed silica having a particle size of 20 to about 60 millimicrons, a surface area of about 50 square meters per gram and present in said composition in an amount of 0.05 to about 1.0 per cent by weight of the composition; and B. the suspending agent being selected from the group consisting of calcium-free acacia, tragacanth, guar gum, dextran, and sucrose.

* * * * *